United States Patent
Urakawa

(10) Patent No.: US 9,904,453 B2
(45) Date of Patent: Feb. 27, 2018

(54) IMAGE DISPLAY APPARATUS AND NON-TRANSITORY STORAGE MEDIUM STORING INSTRUCTIONS EXECUTABLE BY IMAGE DISPLAY APPARATUS

(71) Applicant: Brother Kogyo Kabushiki Kaisha, Nagoya (JP)

(72) Inventor: Yutaka Urakawa, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 636 days.

(21) Appl. No.: 14/449,193

(22) Filed: Aug. 1, 2014

(65) Prior Publication Data

US 2015/0040060 A1 Feb. 5, 2015

(30) Foreign Application Priority Data

Aug. 2, 2013 (JP) ................................ 2013-161093

(51) Int. Cl.
*G06F 3/048* (2013.01)
*G06F 3/0485* (2013.01)
*G06F 3/0488* (2013.01)

(52) U.S. Cl.
CPC ........ *G06F 3/0485* (2013.01); *G06F 3/04883* (2013.01)

(58) Field of Classification Search
CPC ........ G06F 3/033; G06F 3/048; G06F 3/0485; G06F 3/013; G09G 5/08
See application file for complete search history.

(56) References Cited

U.S. PATENT DOCUMENTS

| | | | | |
|---|---|---|---|---|
| 6,714,221 | B1* | 3/2004 | Christie | G06F 3/0485 715/784 |
| 8,686,944 | B1* | 4/2014 | Charlton | G06F 3/0338 345/163 |
| 9,329,759 | B1* | 5/2016 | Hill | G06F 3/04842 |
| 2008/0092078 | A1* | 4/2008 | Takeshima | G06F 3/0485 715/786 |
| 2013/0061168 | A1* | 3/2013 | Nash | G06F 3/04883 715/784 |
| 2013/0091459 | A1* | 4/2013 | Park | G06F 3/0418 715/784 |

(Continued)

FOREIGN PATENT DOCUMENTS

JP 2011-252970 A 12/2011

*Primary Examiner* — Rashawn Tillery
(74) *Attorney, Agent, or Firm* — Burr & Brown, PLLC

(57) ABSTRACT

An image display apparatus includes: a display device for displaying an image; an operation receiving device for receiving a scroll operation for scrolling the image displayed on the display device in a specific direction; a processor; and a memory for storing instructions. When executed, the instructions cause the processor to: acquire a scroll-amount indicator value, that indicates an amount by which the image being displayed on the display device is to be scrolled by the current scroll operation, based on a current scroll operation received by the operation receiving device and on a display of the image on the display device by at least one previous scroll operation which is received by the operation receiving device in advance of the current scroll operation; and control the display device to display the image scrolled according to the acquired scroll-amount indicator value.

8 Claims, 10 Drawing Sheets

(56) References Cited

U.S. PATENT DOCUMENTS

| | | | |
|---|---|---|---|
| 2014/0149935 A1* | 5/2014 | Johnson | G06F 3/0482 715/811 |
| 2015/0135133 A1* | 5/2015 | Munoz-Bustamante | G06F 3/013 715/785 |
| 2016/0124598 A1* | 5/2016 | Yamahara | G06F 3/0485 715/830 |

* cited by examiner

FIG.6

| DISPLAY IMAGE ID | OPERATED BUTTON | SWITCHED IMAGE ID |
|---|---|---|
| 10 | ListItem1 | 101 |
| | ListItem2 | 102 |
| | ListItem3 | 103 |
| 101 | ListItem1-1 | 1011 |
| | ListItem1-2 | 1012 |
| | ListItem1-3 | 1013 |
| | ListItem1-4 | 1014 |
| | ListItem1-5 | 1015 |
| | ListItem1-6 | 1016 |
| | ListItem1-7 | 1017 |
| 102 | ListItem2-1 | 1021 |
| | ListItem2-2 | 1022 |
| | ListItem2-3 | 1023 |
| | ListItem2-4 | 1024 |
| | ListItem2-5 | 1025 |
| | ListItem2-6 | 1026 |
| | ListItem2-7 | 1027 |
| 103 | ListItem3-1 | 1031 |
| | ListItem3-2 | 1032 |
| | ListItem3-3 | 1033 |
| | ListItem3-4 | 1034 |
| | ListItem3-5 | 1035 |
| | ListItem3-6 | 1036 |
| | ListItem3-7 | 1037 |
| | ListItem3-8 | 1038 |

FIG.7

| | $V \geq X_2$ | $X_1 < V < X_2$ | $V \leq X_1$ |
|---|---|---|---|
| AMOUNT OF FIRST SCROLL | 50 | 35 | 15 |
| AMOUNT OF SECOND SCROLL | 35 | 15 | – |
| AMOUNT OF THIRD SCROLL | 15 | – | – |

FIG.8

| | $V \geq X_2$ | $X_1 < V < X_2$ | $V \leq X_1$ |
|---|---|---|---|
| AMOUNT OF FIRST SCROLL | 100 | 70 | 30 |
| AMOUNT OF SECOND SCROLL | 70 | 30 | – |
| AMOUNT OF THIRD SCROLL | 30 | – | – |

IMAGE DISPLAY APPARATUS AND NON-TRANSITORY STORAGE MEDIUM STORING INSTRUCTIONS EXECUTABLE BY IMAGE DISPLAY APPARATUS

CROSS REFERENCE TO RELATED APPLICATION

The present application claims priority from Japanese Patent Application No. 2013-161093, which was filed on Aug. 2, 2013, the disclosure of which is herein incorporated by reference in its entirety.

BACKGROUND

Technical Field

The present invention relates to an image display apparatus including a display device, and a non-transitory storage medium configured to store a plurality of instructions executable by a processor of the image display apparatus.

Description of the Related Art

There is known an image display apparatus including a display device for displaying an image and capable of scrolling the image displayed on the display device. Such an image display apparatus includes an operation receiving device for receiving a scroll operation performed by a user to scroll the image.

SUMMARY

The above-described image display apparatus can display a large image which cannot be displayed on the display device at one time, and the user can scroll such an image to view the entire image. A scroll indicator amount such as a scroll amount and a scroll speed during the image scroll is not changed in a case where a flick operation is performed at the same operation speed or a drag operation is performed by the same operation amount. Accordingly, in a case where the same scroll operation is performed, the image is scrolled in each scroll by the same scroll indicator amount. However, it is possible to consider that an operability of the scroll operation can be improved by changing the scroll indicator amount according to an image or the like displayed on the display device. This invention has been developed to provide a technique for improving the operability of the scroll operation.

The present invention provides an image display apparatus including: a display device configured to display an image thereon; an operation receiving device configured to receive a scroll operation which is performed to scroll the image displayed on the display device in a specific direction; a processor; and a memory configured to store a plurality of instructions. The plurality of instructions, when executed by the processor, cause the processor to perform: acquiring a scroll-amount indicator value, that indicates an amount by which the image being displayed on the display device is to be scrolled by the current scroll operation, based on a current scroll operation received by the operation receiving device and on a display of the image on the display device which is caused by at least one previous scroll operation received by the operation receiving device in advance of the current scroll operation; and controlling the display device to display the image scrolled according to the acquired scroll-amount indicator value.

The present invention also provides an image display apparatus including: a display device configured to display an image thereon; an operation receiving device configured to receive a scroll operation which is performed to scroll the image displayed on the display device in a specific direction; a processor; and a memory configured to store a plurality of instructions. The plurality of instructions, when executed by the processor, cause the processor to perform: acquiring a greater scroll-amount indicator value when a current scroll operation received by the operation receiving device is an operation which causes the image displayed on the display device to be scrolled in a particular direction than when the current scroll operation is an operation which causes the image to be scrolled in a direction opposite the particular direction, the scroll-amount indicator value indicating an amount by which the image being displayed on the display device is to be scrolled by the current scroll operation; and controlling the display device to display the image scrolled according to the acquired scroll-amount indicator value.

The present invention also provides a non-transitory storage medium configured to store a plurality of instructions executable by a processor of an image display apparatus. The image display apparatus includes: a display device configured to display an image thereon; an operation receiving device configured to receive a scroll operation which is performed to scroll the image displayed on the display device in a specific direction; and the processor. The plurality of instructions, when executed by the processor, cause the processor to perform: acquiring a scroll-amount indicator value, that indicates an amount by which the image being displayed on the display device is to be scrolled by the current scroll operation, based on a current scroll operation received by the operation receiving device and on a display of the image on the display device which is caused by at least one previous scroll operation received by the operation receiving device in advance of the current scroll operation; and controlling the display device to display the image scrolled according to the acquired scroll-amount indicator value.

The present invention also provides a non-transitory storage medium configured to store a plurality of instructions executable by a processor of an image display apparatus. The image display apparatus includes: a display device configured to display an image thereon; an operation receiving device configured to receive a scroll operation which is performed to scroll the image displayed on the display device in a specific direction; and the processor. The plurality of instructions, when executed by the processor, cause the processor to perform: acquiring a greater scroll-amount indicator value when a current scroll operation received by the operation receiving device is an operation which causes the image displayed on the display device to be scrolled in a particular direction than when the current scroll operation is an operation which causes the image to be scrolled in a direction opposite the particular direction, the scroll-amount indicator value indicating an amount by which the image being displayed on the display device is to be scrolled by the current scroll operation; and controlling the display device to display the image scrolled according to the acquired scroll-amount indicator value.

BRIEF DESCRIPTION OF THE DRAWINGS

The objects, features, advantages, and technical and industrial significance of the present invention will be better understood by reading the following detailed description of the embodiments of the invention, when considered in connection with the accompanying drawings, in which:

FIG. 6 is a table representing a relationship among display image IDs, buttons to be operated, and image IDs after image switching;

FIG. 7 is a table representing the number of scroll displays and scroll amounts in response to a flick operation;

FIG. 8 is a table representing the number of scroll displays and scroll amounts in response to the flick operation;

DETAILED DESCRIPTION OF THE EMBODIMENTS

Hereinafter, there will be described embodiments of the present invention by reference to the drawings.

<Configuration of MFP>

Figure 1:
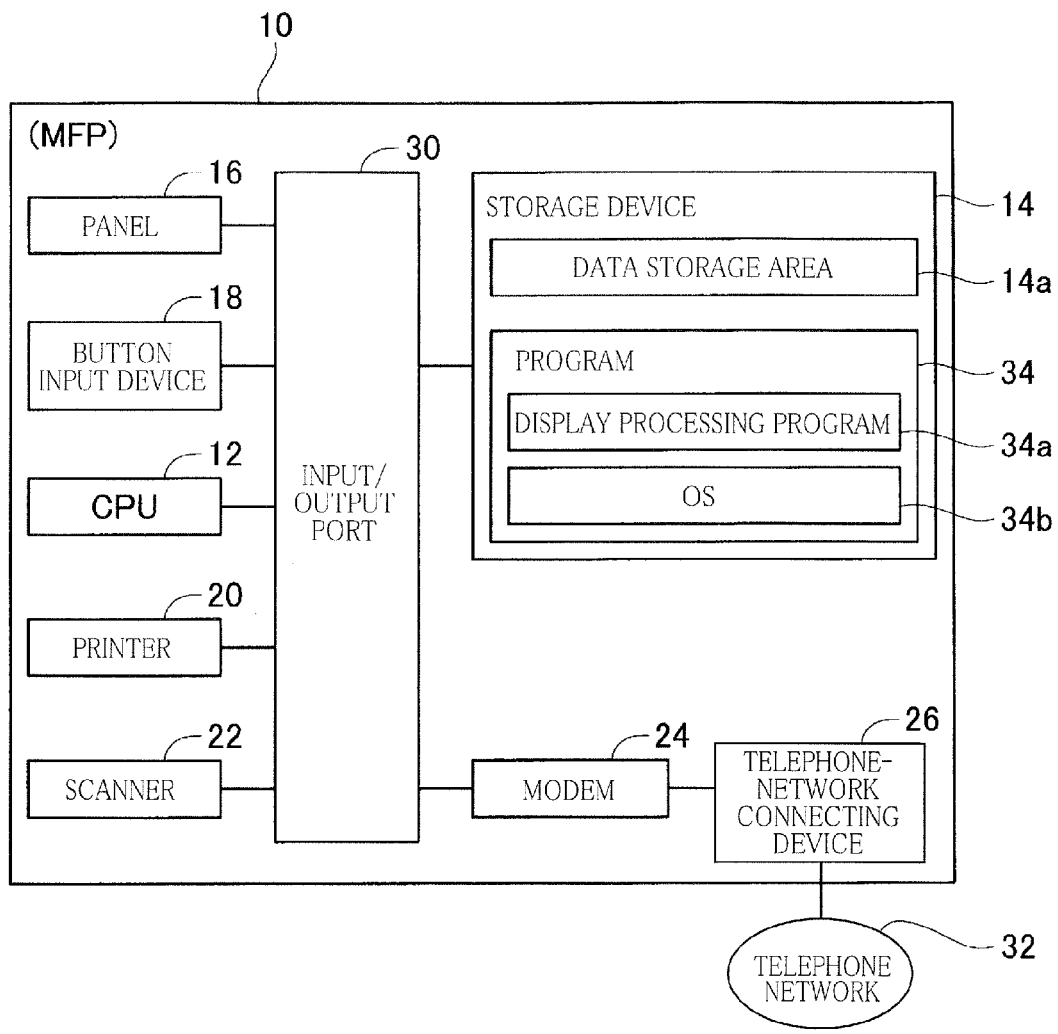
FIG. 1 is a block diagram illustrating a multi-function peripheral (MFP)

FIG. 1 illustrates a multi-function peripheral (MFP) 10 according to one embodiment of the present invention. The MFP 10 includes a central processing unit (CPU) 12, a storage device 14, a panel 16, a button input device 18, a printer 20, a scanner 22, a modem 24, and a telephone-network connecting device 26. These devices are communicable with each other via an input/output port 30.

The CPU 12 executes processings according to a program 34 stored in the storage device 14. In the following description, the CPU 12 which executes a program such as a display processing program 34a and an operating system 34b may be described simply by the name of program. For example, wordings "the display processing program 34a executes" may mean wordings "the CPU 12 executing the display processing program 34a executes". The storage device 14 is constituted by a combination of components such as a random access memory (RAM), a read only memory (ROM), a flash memory, a hard disc (HDD), and a buffer included in the CPU 12.

The storage device 14 stores the program 34. The program 34 includes the display processing program 34a and the operating system 34b (hereinafter may be abbreviated as "OS 34b"). The display processing program 34a is a program for displaying an image or images on the panel 16. The storage device 14 may be a storage device readable by a computer. Examples of such a storage device include non-transitory storage devices such as a ROM, a RAM, a flash memory, and a hard disc. Electric signals for transferring programs downloaded from a server on the Internet are not included in the non-transitory devices.

The OS 34b is a program that provides basic functions used by the display processing program 34a. The OS 34b includes a program for controlling the storage device 14, the panel 16, the button input device 18, and so on.

The storage device 14 includes a data storage area 14a. The data storage area 14a is an area for storing image data and the like. The display processing program 34a causes the OS 34b to output data that causes image data and the like to be stored into the data storage area 14a. Alternatively, the display processing program 34a causes the OS 34b to acquire image data and the like stored in the data storage area 14a.

The panel 16 has a display surface for displaying various functions of the MFP 10. The display processing program 34a outputs image data to cause the OS 34b to display the image data on the panel 16. The button input device 18 includes a touch sensor and is configured integrally with the panel 16. Thus, the button input device 18 detects an input object such as a finger of a user which is approaching or touching the panel 16 and accepts or receives a button operation performed by the user. It is noted that the button operation is detected by a touch operation and a moving-away operation performed within a region at which an operation button detects the input object. Also, the button input device 18 accepts a flick operation or a drag operation performed by the user, by detecting an input-object sliding direction in a state in which the input object has approached or touched the panel 16. It is noted that when the speed of the moving-away operation in the input-object sliding direction is higher than a particular speed in the moving-away operation after the touch operation, the button input device 18 detects the flick operation in the input-object sliding direction. Also, when the input object is detected at a position different from a touched position, the button input device 18 detects the drag operation in a direction directed from the touched position to the input-object detected position. In this detection, the display processing program 34a causes the OS 34b to acquire data indicating a detail of the button operation performed by the user. Specifically, when the operation of the user is the button operation, the display processing program 34a acquires data relating to the operated button. When the operation of the user is the flick operation, the display processing program 34a acquires data relating to a direction of the flick operation and an operation speed in the flick operation. When the operation of the user is the drag operation, the display processing program 34a acquires data relating to a direction of movement of the input object in the drag operation and an amount of movement of the input object in the drag operation, that is, the display processing program 34a acquires data relating to a distance between a touched position and a position of detection of the input object.

The printer 20 performs printing. The scanner 22 performs scanning. The modem 24 converts document data into a signal transmittable to a telephone network 32 and transmits the signal to the telephone network 32 via the telephone-network connecting device 26 using a facsimile function. The modem 24 also receives a signal from the telephone network 32 via the telephone-network connecting device 26 to decode the signal into document data.

Here, definitions of the words "data" and "information" are explained. In the present description, the word "information" is used as a superordinate concept of the word "data". Thus, data A can be replaced by information A. Also, data B replicated from the data A or acquired by conversion of the data A can be replaced by the information A as long as the data B is used in the same meaning as the data A.

<Display of Image on Panel in MFP>

There will be next explained operations of the MFP 10 according to the present embodiment. In this MFP 10, the display processing program 34a is used to cause the panel 16 to display an image or images thereon. In this operation, the image displayed on the panel 16 is scrolled in the up and down direction in response to a scroll operation, i.e., the flick operation or the drag operation, of the user on the button input device 18, i.e., the touch sensor configured integrally with the panel 16. It is noted that the image is scrolled by a larger amount after the image is scrolled to a scroll end than before the image is scrolled to the scroll end.

Figure 2:
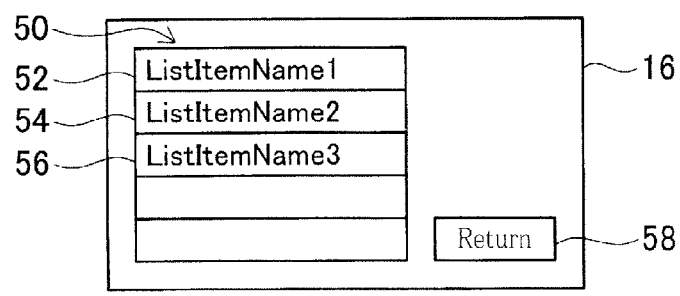
FIG. 2 is a view illustrating a panel displaying an image.

Specifically, when the user performs a specific operation on an initial image displayed on the panel 16, the panel 16 displays an image 50 illustrated in FIG. 2. The image 50 contains three item buttons 52, 54, 56 and a Return button 58. Each of the three item buttons 52, 54, 56 is a button for causing the panel 16 to display an image corresponding to one of the item buttons 52, 54, 56.

Figure 3:
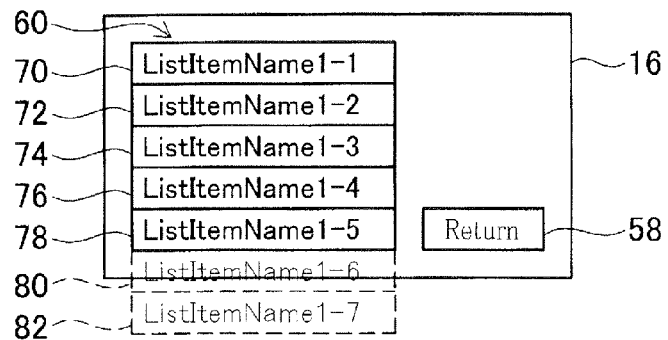
FIG. 3 is a view illustrating a panel displaying an image.
Figure 4:
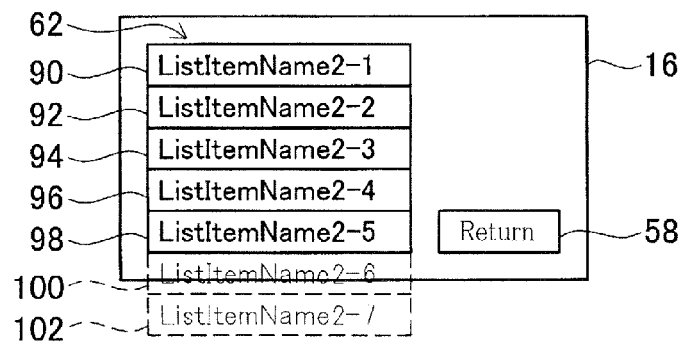
FIG. 4 is a view illustrating a panel displaying an image.
Figure 5:
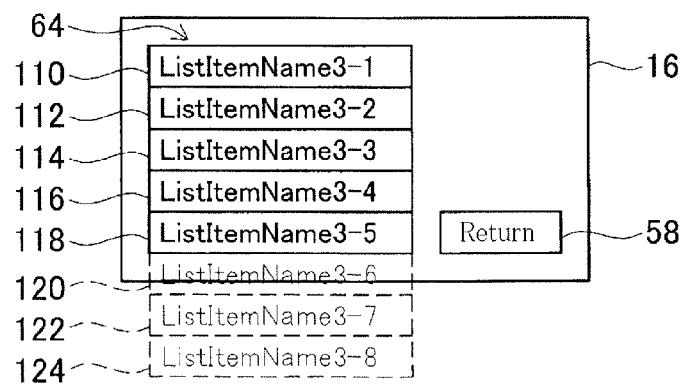
FIG. 5 is a view illustrating a panel displaying an image.

Specifically, an operation of the user on the item button 52 causes the panel 16 to display a display image 60 illustrated in FIG. 3, an operation of the user on the item button 54 causes the panel 16 to display a display image 62 illustrated in FIG. 4, and an operation of the user on the item button 56 causes the panel 16 to display a display image 64 illustrated in FIG. 5. The image 60 contains detailed item buttons 70-82, the image 62 contains detailed item buttons 90-102, and the image 64 contains detailed item buttons 110-124. Each of the detailed item buttons 70-82, 90-102, 110-124 is a button for causing the panel 16 to display images corresponding to one of the detailed item buttons 70-82, 90-102, 110-124.

It is noted that the Return button 58 is displayed on each of the images 60, 62, 64 as in the image 50. The Return button 58 is a button for returning to an image that is displayed just before an image currently displayed on the panel 16. Specifically, when the user touches the Return button 58 on each of the images 60, 62, 64 illustrated in FIGS. 3-5, the image 50 illustrated in FIG. 2 is displayed on the panel 16. When the user touches the Return button 58 on the image 50 illustrated in FIG. 2, the initial image is displayed on the panel 16.

In response to the button operation, the display image is switched according to image IDs respectively set for the display images. Specifically, the image ID "10" is set for the image 50 illustrated in FIG. 2, the image ID "101" for the image 60 illustrated in FIG. 3, the image ID "102" for the image 62 illustrated in FIG. 4, and the image ID "103" for the image 64 illustrated in FIG. 5. The data storage area 14a stores map data illustrated in FIG. 6. This map data represents a relationship between an image ID of each image to be displayed on the panel 16 and corresponding item buttons of the item buttons 52, 54, 56 and the detailed item buttons 70-82, 90-102, 110-124 which are operable in each image. Furthermore, the map data represents a relationship between each of the item buttons 52, 54, 56 and the detailed item buttons 70-82, 90-102, 110-124 and an image ID of an image displayed in response to a button operation, i.e., an image ID of an image displayed after switching of the image in response to the button operation. It is noted that the ID numbers (1011-1017, 1021-1027, and 1031-1038) illustrated in the rightmost column in FIG. 6 respectively represent images each to be displayed when a corresponding one of the detailed item buttons 70-82, 90-102, 110-124 is operated.

In the switching of the display image according to the map data, when any of the item buttons 52, 54, 56 and the detailed item buttons 70-82, 90-102, 110-124 is operated, the image ID of the image displayed after the switching is acquired. The acquired image ID and the image ID of the image being displayed on the panel 16 are then compared with each other, and when the acquired image ID and the image ID of the image being displayed are different from each other, an image corresponding to the acquired image ID is displayed on the panel 16. The image is thus switched in response to the operation button.

<Display of Image in MFP in Response to Scroll Operation>

As illustrated in FIGS. 3-5, the panel 16 can display only five detailed item buttons at most. Specifically, for example, as illustrated in FIG. 3, the five detailed item buttons 70-78 are displayed on the panel 16, and the remaining detailed item buttons 80, 82 are not displayed on the panel 16. To view the detailed item buttons 80, 82 not displayed on the panel 16, the user needs to perform the flick operation or the drag operation. In response to the flick operation or the drag operation, the display image is scrolled in a direction of movement of the input object in the flick operation or the drag operation.

In the drag operation, an amount of scroll of the display image is calculated based on an amount of movement of the input object in the drag operation, and an image is displayed on the panel 16 such that the display image is scrolled by the calculated scroll amount. In the flick operation, the number of scroll displays (i.e., the number of displays of the image per unit time) and a scroll amount in each scroll display are determined based on the speed of the input object moved in the flick operation (i.e., an operation speed in the flick operation). It is noted that the scroll display is a display on the panel 16 which is displayed when a display image is scrolled by a particular amount within a particular length of time. As illustrated in FIG. 7, the number of scroll displays and the scroll amount in each scroll display are set according to the operation speed in the flick operation.

Specifically, for example, when the operation speed V is higher than or equal to a threshold value X2, the scroll amount in the first scroll display (i.e., the scroll display for the first time) is 50 dots, the scroll amount in the second scroll display (i.e., the scroll display for the second time) is 35 dots, and the scroll amount in the third scroll display (i.e., the scroll display for the third time) is 15 dots. That is, the display image is scrolled by 50 dots, 35 dots, or 15 dots within each particular length of time. Also, for example, when the operation speed V is higher than a threshold value $X_1$ and lower than the threshold value $X_2$, the scroll amount in the first scroll display is 35 dots, and the scroll amount in the second scroll display is 15 dots. That is, the display image is scrolled by 35 dots or 15 dots within each particular length of time. Also, for example, when the operation speed V is lower than or equal to the threshold value $X_1$, the scroll amount in the first scroll display is 15 dots. That is, the display image is scrolled by 15 dots within the particular length of time.

In the present embodiment, in a case where the display image has scrolled to the scroll end, an image is displayed on the panel 16 such that the display image scrolls by a larger amount than in a case where the display image has not scrolled to the scroll end. In this MFP 10, specifically, the data storage area 14a stores a history of scrolls caused by the flick operation and the drag operation (noted that this history may be hereinafter referred to as "operation history"). Based on this operation history, the MFP 10 determines whether the display image has scrolled to the scroll end or not. It is noted that the data storage area 14a may store, instead of or in addition to the operation history, an indicator which indicates that an image displayed on the panel 16 in response to at least one previous scroll operation coincides with an image to be displayed on the panel 16 when the display image is scrolled to the scroll end, i.e., an indicator which indicates that the display image has scrolled to the scroll end by the at least one previous scroll operation. When it is determined that the display image has scrolled to the scroll end, the amount of scroll of the display image is calculated in the next drag operation based on a value which is twice the amount of movement of the input object in the drag operation. In the next drag operation, an image is displayed on the panel 16 such that the display image is scrolled by the calculated scroll amount.

In the flick operation performed after the display image has scrolled to the scroll end, the number of scroll displays and the scroll amount in each scroll display illustrated in FIG. 8 are set to be used. Specifically, for example, when the operation speed V is higher than or equal to the threshold value $X_2$, the scroll amount in the first scroll display is 100 dots, the scroll amount in the second scroll display is 70 dots, and the scroll amount in the third scroll display is 30 dots. That is, the display image is scrolled by 100 dots, 70 dots, or 30 dots within each particular length of time. Also, for example, when the operation speed V is higher than the threshold value $X_1$ and lower than the threshold value $X_2$, the scroll amount in the first scroll display is 70 dots, and the scroll amount in the second scroll display is 30 dots. That is, the display image is scrolled by 70 dots or 30 dots within each particular length of time. Also, for example, when the operation speed V is lower than or equal to the threshold value $X_1$, the scroll amount in the first scroll display is 30 dots. That is, the display image is scrolled by 30 dots within the particular length of time.

In this MFP 10 as described above, the scroll amount used after the display image has scrolled to the scroll end is twice the scroll amount used before the display image has scrolled to the scroll end. That is, a scroll amount after the user has viewed the entire image can be made larger than a scroll amount before the user has viewed the entire image. As a result, the scroll speed of the image viewed by the user for the first time can be reduced, allowing the user to reliably view the image. Also, the scroll speed of the image having been viewed by the user can be increased, allowing the user to efficiently select the button from among the item buttons 52, 54, 56 and the like.

<Operation History at Switching of Display Image>

As described above, when one of the item buttons 52, 54, 56 of the image 50 illustrated in FIG. 2 is operated, a corresponding one of the images 60, 62, 64 illustrated in FIGS. 3-5 is displayed on the panel 16. That is, the image 50 illustrated in FIG. 2 and the images 60, 62, 64 illustrated in FIGS. 3-5 have a superior/subordinate relationship. When the display image is switched to the display image having such a superior/subordinate relationship, the operation history is not deleted and kept stored. That is, even when the image is switched, an operation history of the image before the switching is treated as an operation history of the image after the switching, and it is determined whether the display image has scrolled to the scroll end or not based on the operation history after the switching. On the other hand, the image illustrated in FIG. 2 has no superior/subordinate relationship with the initial image unlike the images 60, 62, 64 illustrated in FIGS. 3-5. When the display image is switched to such an image having no superior/subordinate relationship, the operation history is deleted. That is, when the image is switched, the operation history of the image before switching is changed to another operation history, and it is determined based on said another operation history whether the display image has scrolled to the scroll end or not.

That is, in a case where the display image has scrolled to the scroll end, for example, in a state in which the image 60 illustrated in FIG. 3 is being displayed on the panel 16, information indicating that the image 60 has scrolled to the scroll end is stored into the data storage area 14a. Even in a case where the display image is switched to the image 50 illustrated in FIG. 2, the information is kept stored. Furthermore, in a case where the display image is switched back to the image 60 illustrated in FIG. 3, the information is kept stored. As a result, in a case where the display images having the superior/subordinate relationship are switched from one to another, the image having viewed by the user can be scrolled speedily, resulting in an improved operability. On the other hand, in a case where, after the image 60 illustrated in FIG. 3 is scrolled to the scroll end, the display image is switched to the image 50 illustrated in FIG. 2 and then to the initial image, the information indicating that the image 60 has scrolled to the scroll end is deleted from the data storage area 14a. As a result, for example, in a case where a user who views the image 50 and other images is changed to another user, the scroll speed can be changed to a normal speed.

<Display Processing Program>

The display processing program 34a is executed by the CPU 12 of the MFP 10 to control the display of the image on the panel 16 in the above-described scroll operation. There will be next explained, with reference to FIGS. 9-11, a flow for displaying an image on the panel 16 such that the display image scrolls by a larger amount than in a case where the display image has not scrolled to the scroll end.

Figure 9:
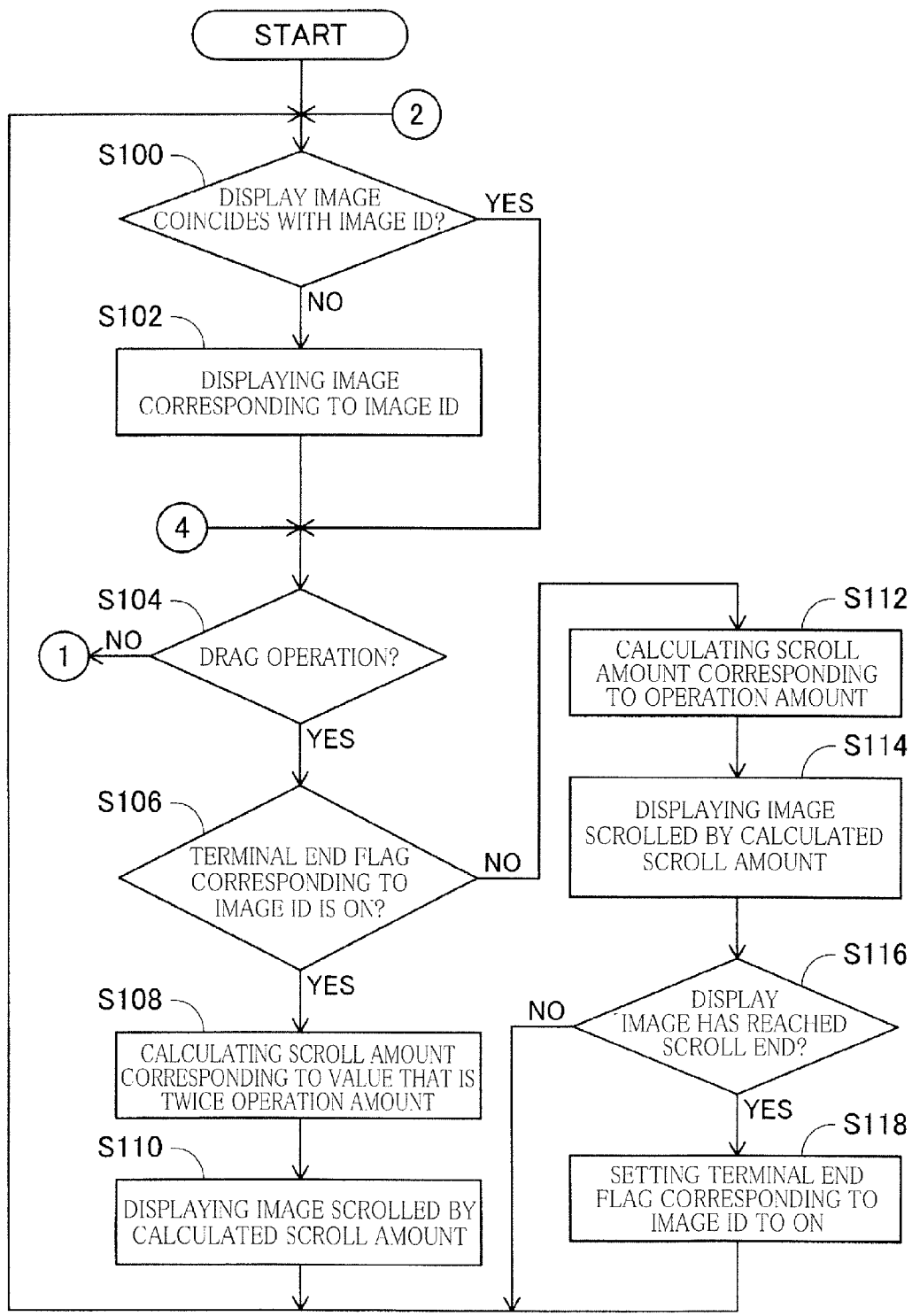
FIG. 9 is a flow chart illustrating operations of the MFP according to a first embodiment.
Figure 10:
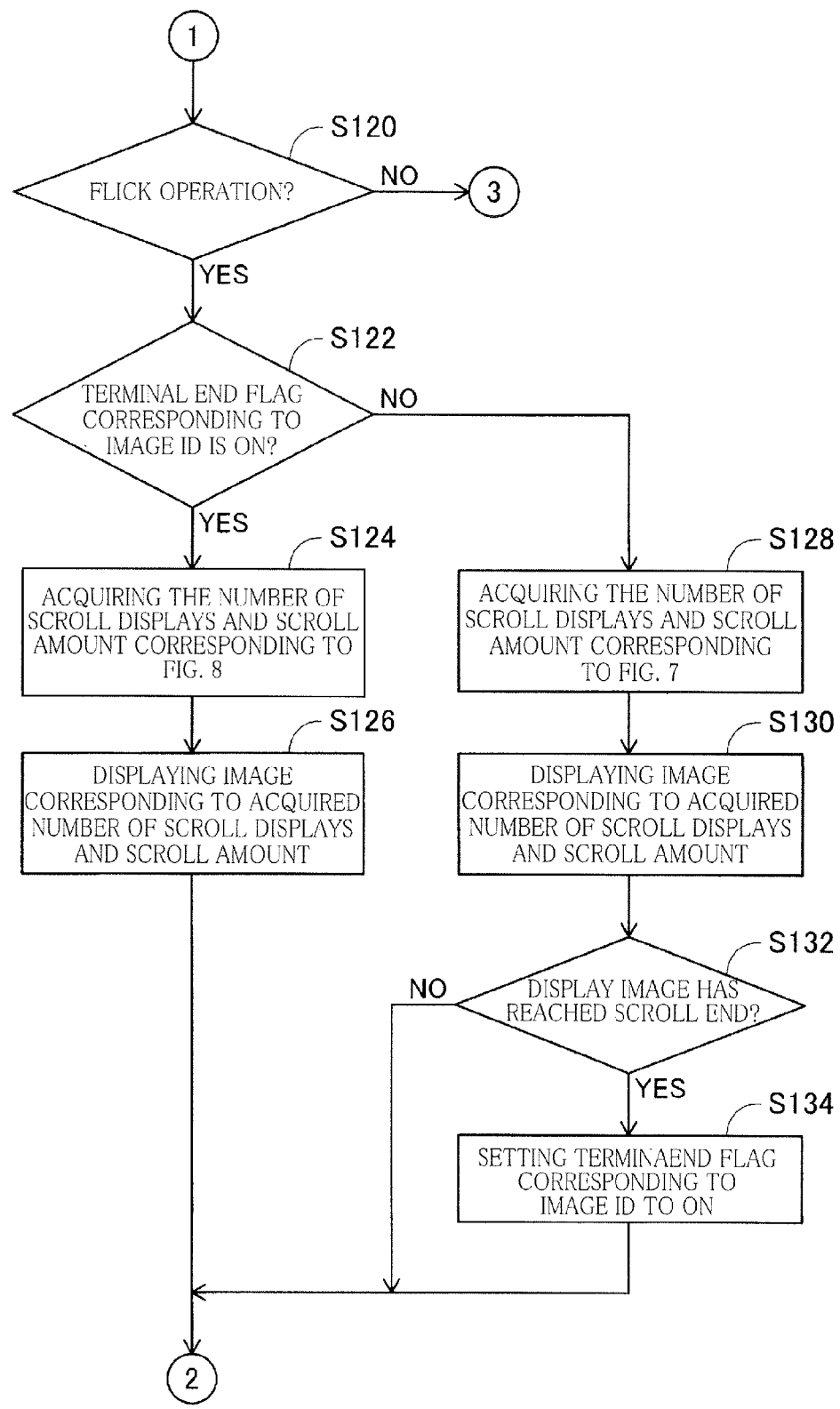
FIG. 10 is another flow chart illustrating operations of the MFP according to the first embodiment.
Figure 11:
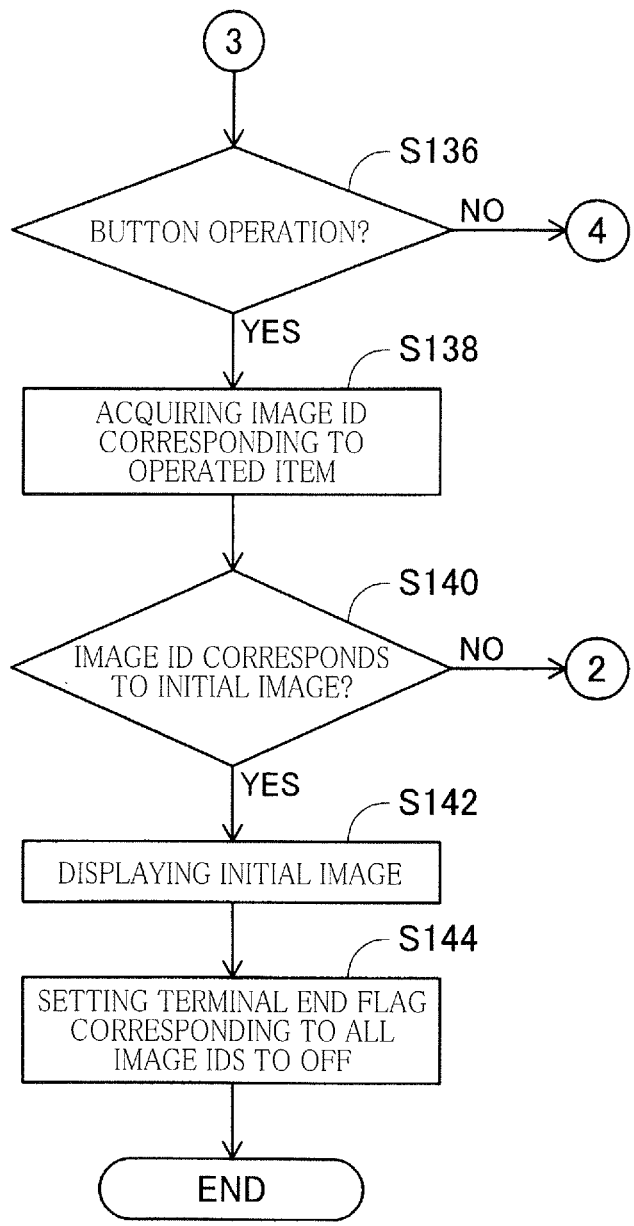
FIG. 11 is another flow chart illustrating operations of the MFP according to the first embodiment.

When the MFP 10 is turned on, and the display processing program 34a is activated, the CPU 12 starts the flow illustrated in FIGS. 9-11. This flow begins with S100 at which the CPU 12 determines whether or not the image ID of the image being displayed on the panel 16 coincides with an image ID acquired in a processing which will be explained later. When the image ID of the display image differs from the acquired image ID (S102: NO), this flow goes to S102. The CPU 12 at S102 controls the OS 34b to output data for causing the panel 16 to display the image corresponding to the acquired image ID. As a result, the image corresponding to the acquired image ID is displayed on the panel 16 as described in the above-described "Display of Image on Panel in MFP". This flow then goes to S104.

When the image ID of the display image coincides with the acquired image ID (S102: YES), this flow goes to S104 without going to S102. The CPU 12 at S104 determines whether data created by the drag operation has been acquired via the OS 34b or not. That is, the CPU 12 determines whether the drag operation has been performed or not. When the drag operation is performed (S104: YES), this flow goes to S106.

The CPU 12 at S106 determines whether a terminal end flag corresponding to the image ID of the image being displayed is ON or not. Specifically, the CPU 12 acquires, via the OS 34b, information about the terminal end flag from the data storage area 14a. The CPU 12 then determines based on the information whether the terminal end flag is ON or not. The terminal end flag indicates whether the display image has scrolled to the scroll end or not. Specifically, the terminal end flag in the ON state indicates that the display image has scrolled to the scroll end, and the terminal end flag in the OFF state indicates that the display image has not scrolled to the scroll end.

When the terminal end flag is ON (S106: YES), this flow goes to S108. As described in the above-described "Display of Image in MFP in response to Scroll Operation", the CPU 12 at S108 calculates a scroll amount corresponding to the value that is twice the amount of movement of the input object in the drag operation, and this flow goes to S110. The CPU 12 at S110 outputs, via the OS 34b, data for causing the panel 16 to display an image scrolled by the calculated scroll amount, and this flow returns to S100.

When the terminal end flag is OFF (S106: NO), this flow goes to S112. As described in the above-described "Display of Image in MFP in response to Scroll Operation", the CPU 12 at S112 calculates a scroll amount corresponding to the amount of movement of the input object in the drag operation, and this flow goes to S114. The CPU 12 at S114 outputs, via the OS 34b, data for causing the panel 16 to display an image scrolled by the calculated scroll amount, and this flow goes to S116.

The CPU 12 at S116 determines whether the display image has scrolled to the scroll end or not. When the display image has scrolled to the scroll end (S116: YES), this flow goes to S118. The CPU 12 at S118 outputs data, for setting the terminal end flag corresponding to the image ID of the image being displayed to "ON", to the data storage area 14a via the OS 34b, and this flow returns to S100. When the display image has not scrolled to the scroll end (S116: NO), this flow returns to S100 without going to S118.

On the other hand, when the CPU 12 at S104 determines that the drag operation has not been performed (S104: NO), this flow goes to S120. The CPU 12 at S120 determines whether data created by the flick operation has been acquired via the OS 34b or not. That is, the CPU 12 determines whether the flick operation has been performed or not. When the flick operation is performed (S120: YES), this flow goes to S122. The CPU 12 at S122 acquires, via the OS 34b, information about the terminal end flag from the data storage area 14a. The CPU 12 then determines based on the information whether the terminal end flag is ON or not. When the terminal end flag is ON (S122: YES), this flow goes to S124.

As described in the above-described "Display of Image in MFP in response to Scroll Operation", the CPU 12 at S124 acquires the number of scroll displays and the scroll amount in each display from the map data corresponding to the table illustrated in FIG. 8, and this flow goes to S126. The CPU 12 at S126 outputs, via the OS 34b, data for causing the panel 16 to display an image corresponding to the acquired number of scroll displays and scroll amount, and this flow returns to S100.

When the terminal end flag is OFF (S122: NO), this flow goes to S128. As described in the above-described "Display of Image in MFP in response to Scroll Operation", the CPU 12 at S128 acquires the number of scroll displays and the scroll amount in each display from the map data corresponding to the table illustrated in FIG. 7, and this flow goes to S130. The CPU 12 at S130 outputs, via the OS 34b, the data for causing the panel 16 to display the image created based on the acquired number of scroll displays and scroll amount, and this flow goes to S132.

The CPU 12 at S132 determines whether the display image has scrolled to the scroll end or not. When the display image has scrolled to the scroll end (S132: YES), this flow goes to S134. The CPU 12 at S134 outputs the data for setting the terminal end flag corresponding to the image ID of the image being displayed to "ON", to the data storage area 14a via the OS 34b, and this flow returns to S100. When the display image has not scrolled to the scroll end (S132: NO), this flow returns to S100 without going to S134.

When the CPU 12 at S120 determines that the flick operation has not been performed (S120: NO), this flow goes to S136. The CPU 12 at S136 determines whether data created in response to a button operation has been acquired via the OS 34b or not. That is, the CPU 12 determines whether the button operation has been performed or not. When the button operation is not performed (S136: NO), this flow returns to S104. When the button operation is performed (S136: YES), this flow goes to S138. The CPU 12 at S138 acquires the image ID corresponding to the operated image item button, e.g., the item button 52, 54, or 56, and this flow goes to S140.

The CPU 12 at S140 determines whether the acquired image ID coincides with the image ID of the initial image or not. When the acquired image ID is not the image ID of the initial image (S140: NO), this flow returns to S100. When the acquired image ID is the image ID of the initial image (S140: YES), this flow goes to S142. The CPU 12 at S142 outputs, via the OS 34b, data for causing the panel 16 to display the initial image, and this flow goes to S144. The CPU 12 at S144 outputs data for setting a terminal end flag corresponding to all the image IDs to "OFF", to the data storage area 14a via the OS 34b, and this flow ends.

Second Embodiment

There will be next explained operations of an MFP 10 according to a second embodiment. It is noted that the MFP 10 according to the second embodiment is similar in configuration to the MFP 10 according to the first embodiment, and an explanation of which is dispensed with.

In the MFP 10 according to the second embodiment, the scroll amount by which the image having been displayed on the panel 16 is displayed again on the panel 16 is larger than the scroll amount by which the image not having been displayed on the panel 16 is displayed on the panel 16. Specifically, when the image is displayed on the panel 16, a boundary between the item buttons (e.g., the item buttons 52, 54, 56) being displayed on the panel 16 and the item buttons (e.g., the item buttons 52, 54, 56) not being displayed on the panel 16 is stored into the data storage area 14a. This boundary stored into the data storage area 14a divides the image into an image (i.e., a portion of the image) displayed on the panel 16 by the at least one previous scroll operation and an image (i.e., a portion of the image) not displayed on the panel 16 by the at least one previous scroll operation. The data storage area 14a stores a position of the boundary with respect to the item buttons (e.g., the item buttons 52, 54, 56) being displayed on the panel 16, in other words, the data storage area 14a stores a position of the boundary in the image. When the drag operation is performed as the scroll operation, the CPU 12 calculates a scroll amount corresponding to a value that is twice the amount of current movement of the input object in the drag operation and creates an image scrolled by the calculated scroll amount. When the created image does not contain the boundary, the image having not been displayed on the panel 16 is not displayed on the panel 16, that is, the image having been displayed on the panel 16 is displayed again on the panel 16. Thus, the image created based on the increased scroll amount is displayed on the panel 16. As a result, the scroll speed of the image having been viewed by the user can be increased, allowing the user to efficiently select the button from among the item buttons 52, 54, 56 and the like.

When the image created based on the increased scroll amount contains the boundary, on the other hand, the image having not been displayed on the panel 16 is displayed on the panel 16. In this case, the image viewed by the user for the first time may be scrolled at a relatively high speed. To prevent this problem, the CPU 12 calculates a scroll amount corresponding to an amount of current movement of the input object in the drag operation and creates an image based on the calculated scroll amount instead of the image created based on the increased scroll amount. That is, in the case where the image created in response to the current scroll operation contains the boundary, the scroll amount of the image is reduced in half when compared with the case where the image created in response to the current scroll operation does not contain the boundary. The image is then displayed on the panel 16. As a result, the scroll speed of the image viewed by the user for the first time can be reduced, allowing the user to reliably view the image.

When the flick operation is performed as the scroll operation, the CPU 12 acquires the number of scroll displays and the scroll amount in each display based on the operation speed of the flick operation from the map data corresponding to the table illustrated in FIG. 8 to increase the scroll amount. The CPU 12 then creates the image to be displayed, based on the number of scroll displays and the scroll amount in each display. When the created image does not contain the boundary, the image having not been displayed on the panel 16 is not displayed on the panel 16, that is, the image having been displayed on the panel 16 is displayed again on the panel 16. Thus, the image created to increase the scroll amount is displayed on the panel 16 based on the operation speed of the flick operation which is acquired from the map data corresponding to the table illustrated in FIG. 8. This configuration can increase the scroll speed of the image having been viewed by the user, allowing the user to efficiently select the button from among the item buttons 52, 54, 56 and the like.

When the image created to increase the scroll amount contains the boundary, on the other hand, the image having not been displayed on the panel 16 is displayed on the panel 16. That is, the image viewed by the user for the first time may be scrolled at a relatively high speed. To prevent this problem, the CPU 12 calculates a scroll amount corresponding to the operation speed of the flick operation and acquires the number of scroll displays and the scroll amount in each display, based on the operation speed of the flick operation, from the map data corresponding to the table illustrated in FIG. 7. The CPU 12 then creates the image to be displayed, based on the number of scroll displays and the scroll amount in each display instead of the image created to increase the scroll amount. The image is then displayed on the panel 16. This configuration can reduce the scroll speed of the image viewed by the user for the first time, allowing the user to reliably view the image.

Figure 12:
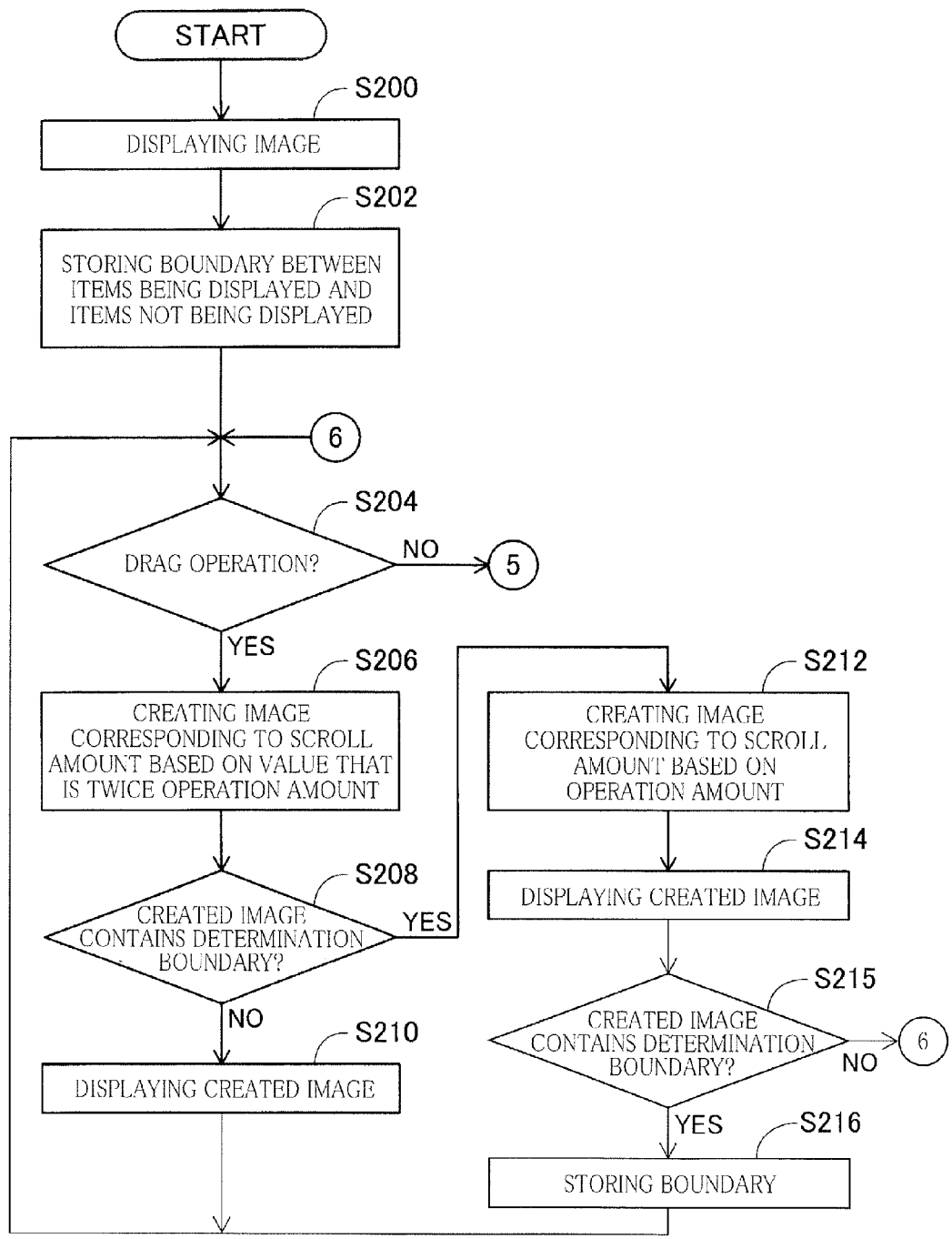
FIG. 12 is a flow chart illustrating operations of an MFP according to a second embodiment.
Figure 13:
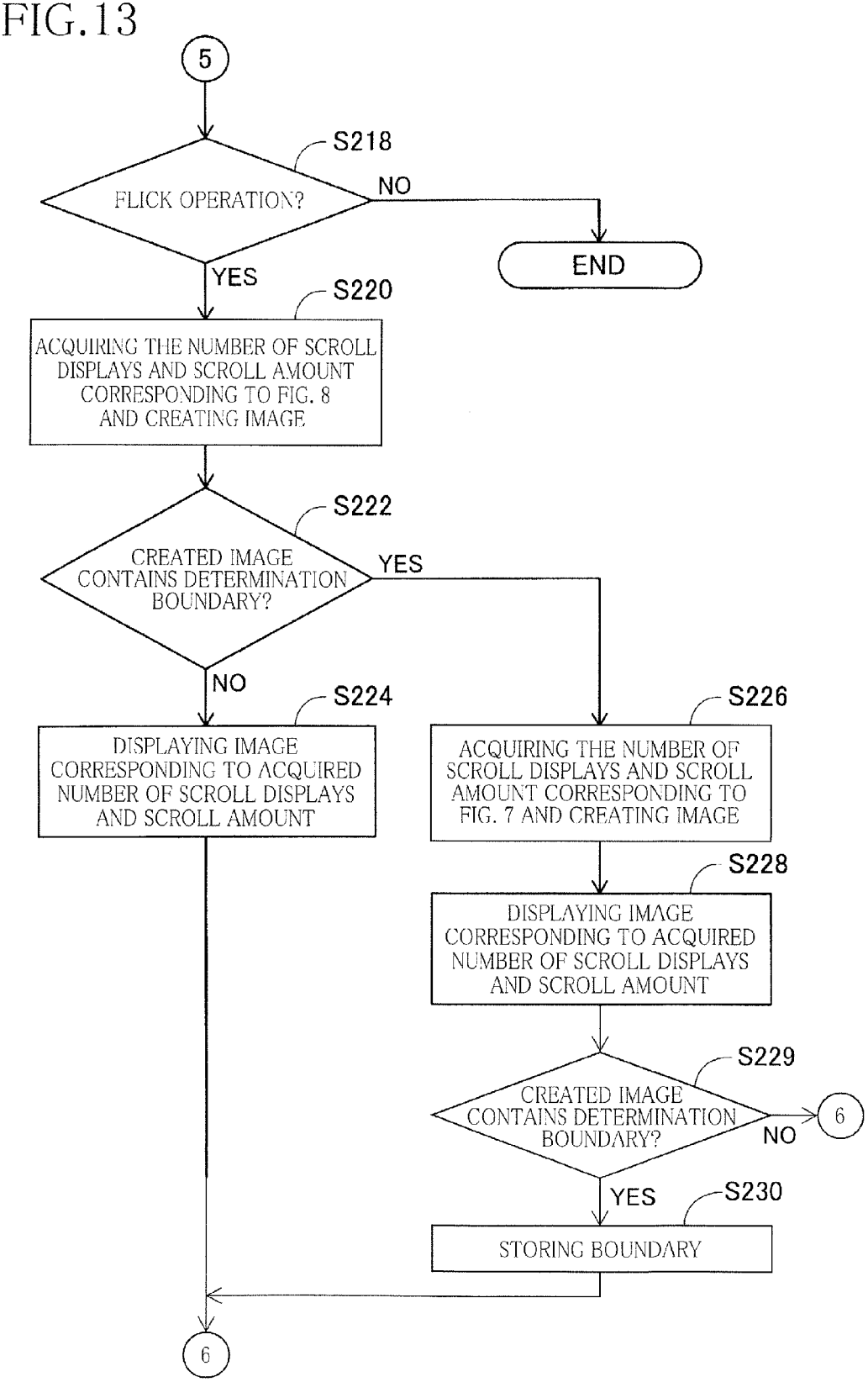
FIG. 13 is another flow chart illustrating operations of the MFP according to the second embodiment.

There will be next explained, with reference to FIGS. 12 and 13, a flow in which a scroll amount by which the image having been displayed on the panel 16 is displayed again on the panel 16 is larger than a scroll amount by which the image having not been displayed on the panel 16 is displayed on the panel 16. This flow begins with S200 at which the CPU 12 controls the OS 34*b* to output data for displaying the image on the panel 16. As a result, the image is displayed on the panel 16, and this flow goes to S202. It is noted that the following explanation is given, assuming that the image 60 illustrated in FIG. 3 is displayed on the panel 16.

The CPU 12 at S202 controls the OS 34*b* to output data for storing, into the data storage area 14*a*, a boundary (hereinafter may be referred to as "determination boundary") between the detailed item buttons being displayed on the panel 16 and the detailed item buttons not being displayed on the panel 16. As a result, the determination boundary is stored in the data storage area 14*a*. Specifically, for example, in a case where the image 60 illustrated in FIG. 3 is being displayed on the panel 16, a boundary between the detailed item button 78 and the detailed item button 80 is stored into the data storage area 14*a* as the determination boundary. Upon completion of the processing at S202, this flow goes to S204.

The CPU 12 at S204 determines whether data created by the drag operation has been acquired via the OS 34*b* or not. That is, the CPU 12 determines whether the drag operation has been performed or not. When the drag operation is performed (S204: YES), this flow goes to S206. The CPU 12 at S206 calculates a value that is twice the scroll amount corresponding to the amount of movement of the input object in the drag operation and creates an image scrolled by the calculated scroll amount, and this flow goes to S208.

The CPU 12 at S208 determines whether the created image contains the determination boundary or not. Specifically, the CPU 12 acquires information about the determination boundary, from the data storage area 14*a* via the OS 34*b* and then determines whether the created image contains the determination boundary or not. When the created image does not contain the determination boundary (S208: NO), this flow goes to S210. The CPU 12 at S210 controls the OS 34*b* to output data for displaying the created image on the panel 16, and this flow returns to S204.

When the created image contains the determination boundary (S208: YES), this flow goes to S212. The CPU 12 at S212 calculates a scroll amount corresponding to the amount of movement of the input object in the drag operation and creates an image scrolled by the calculated scroll amount, and this flow goes to S214. The CPU 12 at S214 controls the OS 34*b* to output data for displaying the created image on the panel 16. The CPU 12 at S215 determines whether the created image contains the determination boundary or not. When the created image contains the determination boundary (S215: YES), this flow goes to S216. The CPU 12 at S216 controls the OS 34*b* to output data for storing the determination boundary into the data storage area 14*a*, and this flow returns to S204. When the created image does not contain the determination boundary (S215: NO), this flow returns to S204.

When the CPU 12 at S204 determines that the drag operation has not been performed (S204: NO), this flow goes to S218. The CPU 12 at S218 determines whether data created by the flick operation has been acquired via the OS 34*b* or not. That is, the CPU 12 determines whether the flick operation has been performed or not. When the flick operation is not performed (S218: NO), this flow ends. When the flick operation is performed (S218: YES), this flow goes to S220. The CPU 12 at S220 acquires the number of scroll displays and the scroll amount in each display from the map data corresponding to the table illustrated in FIG. 8 and creates an image to be displayed on the panel 16, and this flow goes to S222.

The CPU 12 at S222 determines whether the image created based on the acquired number of scroll displays and scroll amount in each display contains the determination boundary or not. When the image does not contain the determination boundary (S222: NO), this flow goes to S224. The CPU 12 at S224 outputs, via the OS 34*b*, the data for causing the panel 16 to display the image created based on the acquired number of scroll displays and scroll amount, and this flow returns to S204.

When the image contains the determination boundary (S222: YES), this flow goes to S226. The CPU 12 at S226 acquires the number of scroll displays and the scroll amount in each display from the map data corresponding to the table illustrated in FIG. 7 and creates an image to be displayed on the panel 16, and this flow goes to S228. The CPU 12 at S228 controls the OS 34b to output data for causing the panel 16 to display the image created based on the acquired number of scroll displays and scroll amount. The CPU 12 at S229 determines whether the created image contains the determination boundary or not. When the created image contains the determination boundary, this flow goes to S230. The CPU 12 at S230 controls the OS 34b to output data for storing the determination boundary into the data storage area 14a, and this flow returns to S204. When the created image does not contain the determination boundary (S229: NO), this flow returns to S204.

Third Embodiment

There will be next explained operations of an MFP 10 according to a third embodiment. It is noted that the MFP 10 according to the third embodiment is similar in configuration to the MFP 10 according to the first embodiment, and an explanation of which is dispensed with.

The MFP 10 according to the third embodiment is configured such that a scroll amount by which the image is scrolled downward is larger than a scroll amount by which the image is scrolled upward. Specifically, when the drag operation is performed in the up direction, the CPU 12 calculates a scroll amount corresponding to the amount of movement of the input object in the drag operation. When the drag operation is performed in the down direction, the CPU 12 calculates a scroll amount corresponding to a value that is twice the amount of movement of the input object in the drag operation and creates an image scrolled by the calculated scroll amount.

When the flick operation is performed in the up direction, the number of scroll displays and the scroll amount in each display are acquired from the map data corresponding to the table illustrated in FIG. 7 to scroll the image according to the operation speed of the flick operation. When the flick operation is performed in the down direction, on the other hand, the number of scroll displays and the scroll amount in each display are acquired from the map data corresponding to the table illustrated in FIG. 8 to scroll the image according to a value that is twice the operation speed of the flick operation. The CPU 12 then creates the image to be displayed, based on the number of scroll displays and the scroll amount in each display.

In general, when the scroll operation is performed in the up direction, a new image, i.e., an image not having been displayed on the panel 16 is displayed on the panel 16, and when the scroll operation is performed in the down direction, a viewed image, i.e., an image having been displayed on the panel 16 is displayed on the panel 16. In the MFP 10 according to the third embodiment, as in the MFP 10 according to the first embodiment and the second embodiment, it is possible to reduce the scroll speed of the image viewed by the user for the first time and increase the scroll speed of the image having been viewed by the user.

Figure 14:
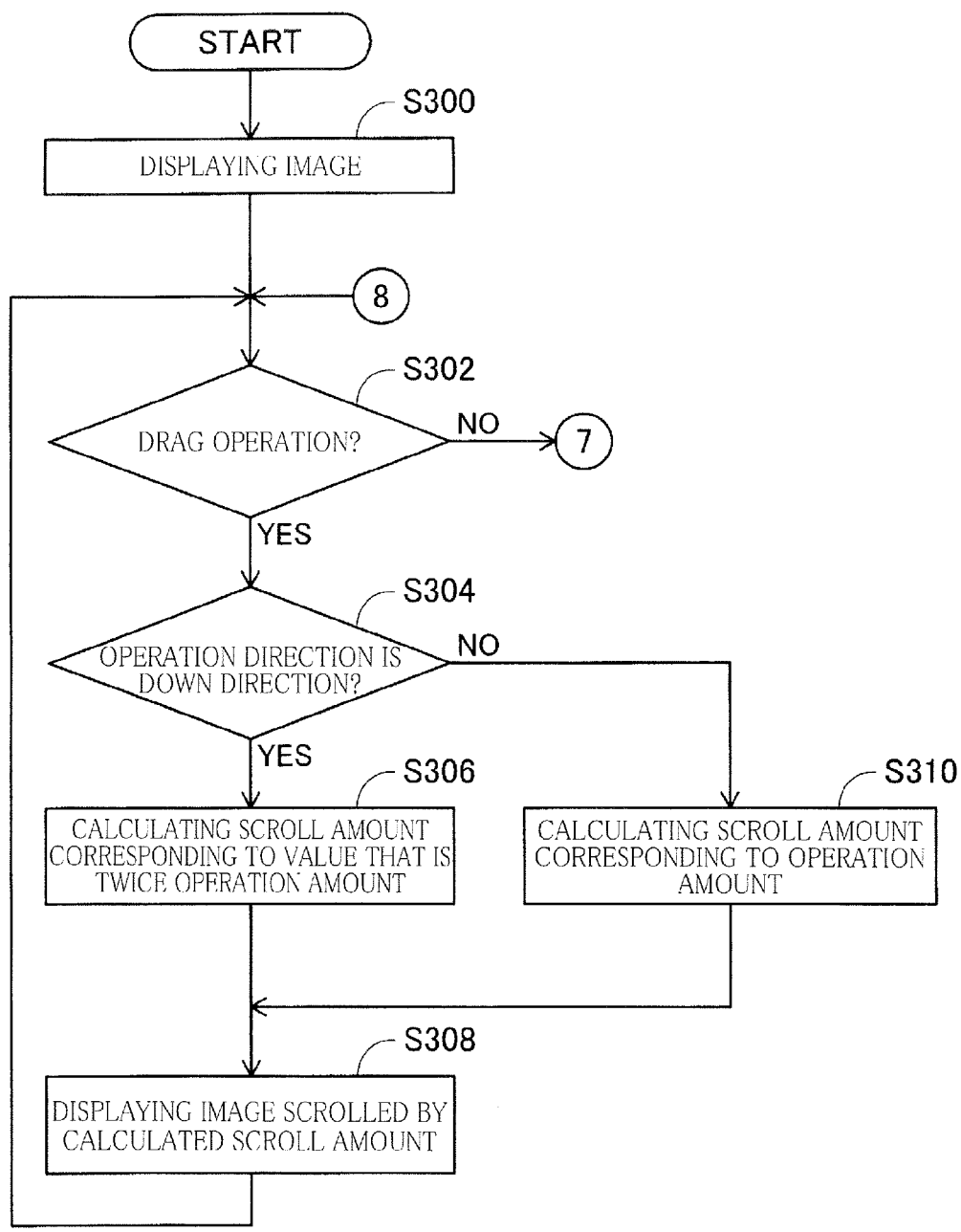
FIG. 14 is a flow chart illustrating operations of an MFP according to a third embodiment.
Figure 15:
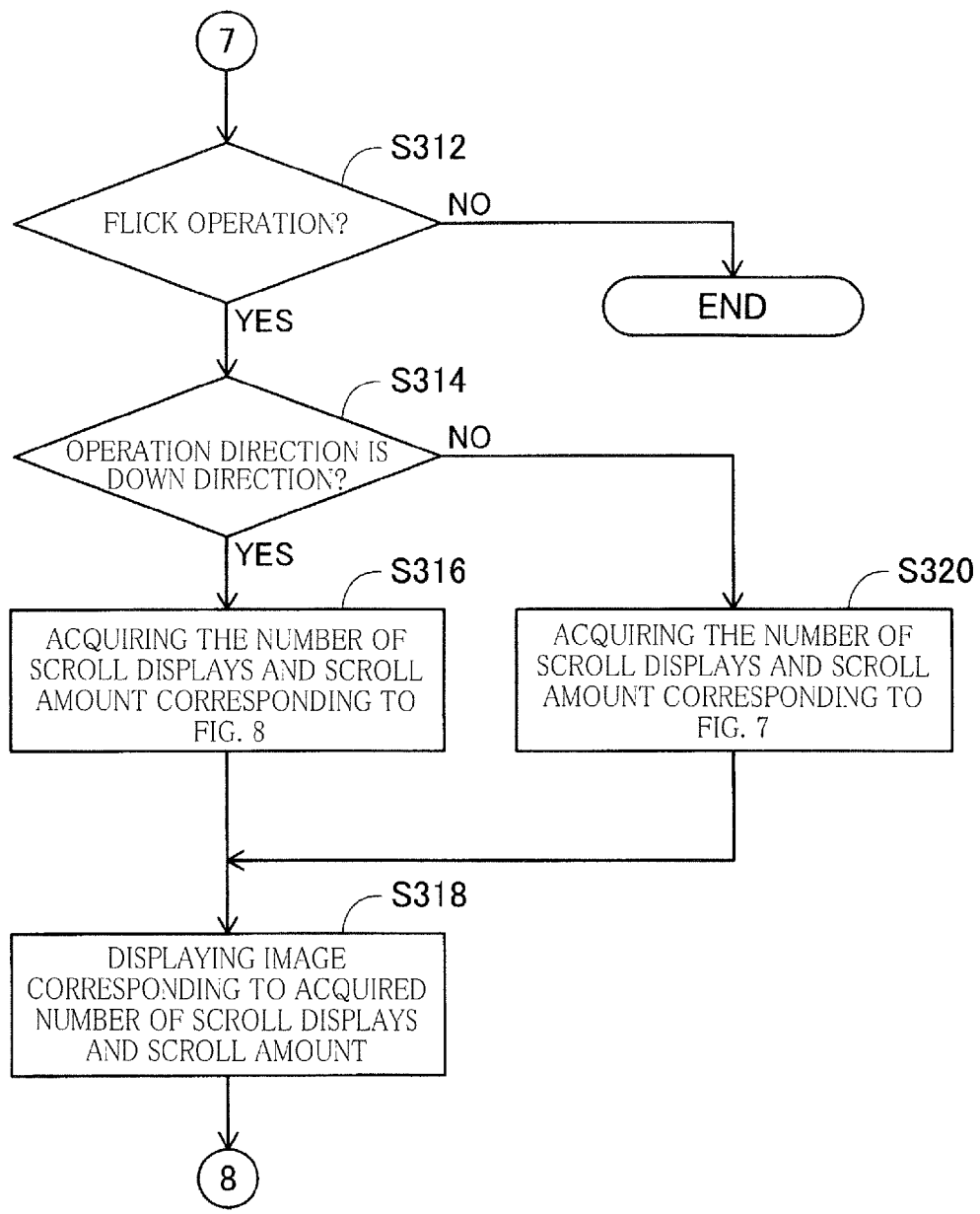
FIG. 15 is another flow chart illustrating operations of the MFP according to the third embodiment.

There will be next explained, with reference to FIGS. 14 and 15, a flow in which a scroll amount of the image scrolled in the down direction is made larger than a scroll amount of the image scrolled in the up direction. This flow begins with S300 at which the CPU 12 controls the OS 34b to output data for displaying the image on the panel 16. As a result, the image is displayed on the panel 16, and this flow goes to S302.

The CPU 12 at S302 determines whether data created by the drag operation has been acquired via the OS 34b or not. That is, the CPU 12 determines whether the drag operation has been performed or not. When the drag operation is performed (S302: YES), this flow goes to S304. The CPU 12 at S304 determines whether the direction of movement of the input object in the drag operation is the down direction or not. Specifically, the CPU 12 controls the OS 34b to acquire data created by the drag operation and determines based on the acquired data whether the direction of movement of the input object in the drag operation is the down direction or not. When the direction of movement of the input object in the drag operation is the down direction (S304: YES), this flow goes to S306.

The CPU 12 at S306 calculates a scroll amount corresponding to the value that is twice the amount of movement of the input object in the drag operation, and this flow goes to S308. The CPU 12 at S308 outputs, via the OS 34b, data for causing the panel 16 to display an image scrolled by the calculated scroll amount, and this flow returns to S302. When the CPU 12 at S304 determines that the direction of movement of the input object in the drag operation is not the down direction (S304: NO), this flow goes to S310. The CPU 12 at S310 calculates a scroll amount corresponding to the amount of movement of the input object in the drag operation, and this flow goes to S308.

When the CPU 12 determines that the drag operation has not been performed (S302: NO), this flow goes to S312. The CPU 12 at S312 determines whether data created by the flick operation has been acquired via the OS 34b or not. That is, the CPU 12 determines whether the flick operation has been performed or not. When the flick operation is not performed (S312: NO), this flow ends. When the flick operation is performed (S312: YES), this flow goes to S314.

The CPU 12 at S314 determines whether the direction of movement of the input object in the flick operation is the down direction or not. Specifically, the CPU 12 controls the OS 34b to acquire data created by the flick operation and determines based on the acquired data whether the direction of movement of the input object in the flick operation is the down direction or not. When the direction of movement of the input object in the flick operation is the down direction (S314: YES), this flow goes to S316.

The CPU 12 at S316 acquires the number of scroll displays and the scroll amount in each display from the map data corresponding to the table illustrated in FIG. 8, and this flow goes to S318. The CPU 12 at S318 outputs, via the OS 34b, data for causing the panel 16 to display the image created based on the acquired number of scroll displays and scroll amount, and this flow returns to S302. When the CPU 12 at S314 determines that the direction of movement of the input object in the flick operation is not the down direction (S314: NO), this flow goes to S320. The CPU 12 at S320 acquires the number of scroll displays and the scroll amount in each display from the map data corresponding to the table illustrated in FIG. 7, and this flow goes to S318.

<Modifications>

The present invention is applied to the scroll of the image in the flick operation and the drag operation in the present embodiment but may be applied to a scroll of the image which is caused using a scroll box or a scroll button, for example. It is noted that when the present invention is applied to the scroll of the image which is caused using, e.g., the scroll box or the scroll button, the CPU 12 calculates a scroll amount, i.e., a scroll speed per unit time according to a length of time of operation of the scroll button. That is, when the viewed image is to be displayed on the panel 16 or when the image is to be scrolled upward, for example, the CPU 12 calculates a scroll speed according to a value that is twice the length of time of operation of the scroll button.

The present invention is applied to the image scrolled in the up and down direction in the present embodiment but may be applied to the image scrolled in the right and left direction.

An apparatus or a device which displays the image in the above-described scroll is not limited to the MFP 10. Specifically, the present invention is applicable to various types of apparatuses and devices such as a personal computer and a mobile terminal, e.g., a smartphone as long as the apparatuses and devices include a display device capable of displaying a scrolling image.

In the present embodiment, the CPU 12 executes the processings according to the display processing program 34a, but the present invention is not limited to this configuration. For example, the CPU 12 may be configured to, according to the display processing program 34a, output a command for causing the OS 34b, another system, or another hardware to execute various processings.

While the display processing program 34a is executed to execute the processings in the flow illustrated in FIGS. 9-11 in the above-described embodiment, the processings at S100-S106, S116, S120, S122, S132, and S136-S144 may be omitted from the flow. Also, the processings at S200, S204, S208, S218, and S222 may be omitted from the flow in FIGS. 12 and 13. Also, the processings at S300-S304, S312, and S314 may be omitted from the flow in FIGS. 14 and 15. It is noted that these processings may be partly omitted.

The technical components described in the present specification or the drawings exhibit technical utility individually or in various combinations, and are not limited to the combinations disclosed in the claims at the time of application. Furthermore, the techniques illustrated in the present specification or the drawings may simultaneously achieve a plurality of objects, and has technical utility by achieving one of these objects.

The MFP 10 is one example of an image display apparatus. The CPU 12 is one example of a computer and a processor. The storage device 14 is one example of a memory. The panel 16 is one example of a display device. The button input device 18 is one example of an operation receiving device. The display processing program 34a is one example of a plurality of instructions.

It is noted that each program may be constituted by a single program module or a plurality of program modules. Each of the above-described examples may be in other forms as long as the similar function is exhibited. For example, each example may be: a computer, e.g., the CPU 12, for executing processings based on the display processing program 34a; a computer for executing processings based on a program different from the display processing program, e.g., an operating system and other applications and programs; hardware, e.g., the panel 16, operable according to a command supplied from a computer; and a configuration in which a computer and hardware cooperate. It should be understood that each example may be a computer configured to execute processings by executing processings according to a plurality of programs and may be hardware operable by a command supplied from a computer configured to execute processings by executing processings according to a plurality of programs.

What is claimed is:

1. An image display apparatus comprising:
a display device configured to display an image thereon;
an operation receiving device configured to receive a scroll operation which is performed to scroll the image displayed on the display device in a specific direction;
a processor; and
a memory configured to store a plurality of instructions,
wherein the plurality of instructions, when executed by the processor, cause the processor to perform
acquiring a scroll-amount indicator value that indicates an amount by which the image being displayed on the display device is to be scrolled by the current scroll operation, based on a current scroll operation received by the operation receiving device and on a display of the image on the display device which is caused by at least one previous scroll operation received by the operation receiving device in advance of the current scroll operation, and
controlling the display device to display the image scrolled according to the acquired scroll-amount indicator value,
wherein when the image displayed on the display device is changed from a first image, as an image displayed before the change, to a second image, as an image displayed after the change, and when the first image and the second image are associated with each other, the plurality of instructions, when executed by the processor cause the processor, to acquire the scroll-amount indicator value based on the second image, and
wherein when the image displayed on the display device is changed from the first image to the second image, and when the first image and the second image are not associated with each other, the plurality of instructions when executed by the processor cause the processor to acquire the scroll-amount indicator value based on the first image.

2. The image display apparatus according to claim 1, wherein the scroll-amount indicator value indicates a scroll amount that is an amount by which the image is to be scrolled by the current scroll operation.

3. The image display apparatus according to claim 1, wherein when the current scroll operation is a flick operation, the scroll-amount indicator value indicates a number of displays of the image on the display device by the current scroll operation and a scroll amount that is an amount by which the image is to be scrolled in each of the displays of the image on the display device.

4. The image display apparatus according to claim 1, wherein when the current scroll operation is a drag operation, the scroll-amount indicator value indicates a scroll amount that is an amount by which the image is to be scrolled by the current scroll operation.

5. The image display apparatus according to claim 1, wherein the scroll-amount indicator value indicates a scroll speed which is a speed at which the image is scrolled by the current scroll operation.

6. A non-transitory storage medium configured to store a plurality of instructions executable by a processor of an image display apparatus, the image display apparatus comprising: a display device configured to display an image thereon; an operation receiving device configured to receive a scroll operation which is performed to scroll the image displayed on the display device in a specific direction; and the processor,
wherein the plurality of instructions, when executed by the processor, cause the processor to perform
acquiring a scroll-amount indicator value that indicates an amount by which the image being displayed on the display device is to be scrolled by the current scroll operation, based on a current scroll operation received by the operation receiving device and on a display of the image on the display device which is caused by at least one previous scroll operation received by the operation receiving device in advance of the current scroll operation, and controlling the display device to display the image scrolled according to the acquired scroll-amount indicator value, wherein when the image displayed on the display device is changed from a first image, as an image displayed before the change, to a second image, as an image displayed after the change, and when the first image and the second image are associated with each other, the plurality of instructions, when executed by the processor, cause the processor to acquire the scroll-amount indicator value based on the second image, and wherein when the image displayed on the display device is changed from the first image to the second image, and when the first image and the second image are not associated with each other, the plurality of instructions when executed by the processor cause the processor to acquire the scroll-amount indicator value based on the first image.

7. The image display apparatus according to claim 1, wherein the image comprises a scroll end portion that is displayed on the display device when the image is scrolled in the specific direction by a maximum amount, and wherein when executed by the processor, the plurality of instructions cause the processor to acquire a greater scroll-amount indicator value when the scroll end portion has already been displayed by the at least one previous scroll operation than when the scroll end portion has not been displayed by the at least one previous scroll operation.

8. The image display apparatus according to claim 7, wherein when executed by the processor, the plurality of instructions cause the processor to store information that the scroll end portion has already been displayed by the at least one previous scroll operation, when the scroll end portion is displayed on the display device by the current scroll operation.

* * * * *